(12) United States Patent
Tanaka

(10) Patent No.: US 10,781,921 B2
(45) Date of Patent: Sep. 22, 2020

(54) VEHICLE POWER TRANSMISSION DEVICE

(71) Applicant: Honda Motor Co., Ltd., Tokyo (JP)

(72) Inventor: Shuhei Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 16/297,740

(22) Filed: Mar. 11, 2019

(65) Prior Publication Data

US 2019/0285175 A1 Sep. 19, 2019

(30) Foreign Application Priority Data

Mar. 16, 2018 (JP) ................. 2018-049882

(51) Int. Cl.
| F16H 63/34 | (2006.01) |
| F16H 59/72 | (2006.01) |
| F16H 59/46 | (2006.01) |
| B60K 1/00 | (2006.01) |
| F16H 63/48 | (2006.01) |

(52) U.S. Cl.
CPC .......... F16H 63/3425 (2013.01); B60K 1/00 (2013.01); F16H 63/48 (2013.01); B60K 2001/001 (2013.01); F16H 59/46 (2013.01); F16H 59/72 (2013.01); F16H 2312/12 (2013.01)

(58) Field of Classification Search
CPC ...... F16H 59/46; F16H 59/72; F16H 63/3425; F16H 48/22; F16H 48/24; B60K 2001/001
See application file for complete search history.

(56) References Cited

U.S. PATENT DOCUMENTS

| 5,662,188 | A | * | 9/1997 | Ito | ............................ | B62D 5/07 |
| | | | | | | 184/11.1 |
| 9,222,565 | B2 | * | 12/2015 | Pichler | ..................... | F16H 48/22 |
| 9,657,828 | B2 | * | 5/2017 | Larsson | ................... | F16H 48/06 |
| 9,914,357 | B1 | * | 3/2018 | Janson | ................. | B60K 17/344 |
| 10,632,987 | B2 | * | 4/2020 | Tanaka | ................... | B60K 17/12 |
| 2013/0303327 | A1 | * | 11/2013 | Pichler | .................... | B60T 1/005 |
| | | | | | | 475/224 |
| 2019/0210589 | A1 | * | 7/2019 | Tanaka | .................... | B60K 17/12 |

FOREIGN PATENT DOCUMENTS

JP 2009061923 3/2009

* cited by examiner

*Primary Examiner* — David R Morris
(74) *Attorney, Agent, or Firm* — JCIPRNET

(57) ABSTRACT

There is provided a vehicle power transmission device which transmits power output from an electric motor (driving source) to left and right axles through planetary gear mechanisms and a differential device. In the device in which a parking gear is provided in a carrier of the planetary gear mechanism, the parking gear is supported on the carrier so that it is relatively rotatable, and a dog clutch (contact and release mechanism) for bringing the parking gear and the carrier into contact and disconnecting them is provided.

9 Claims, 5 Drawing Sheets

VEHICLE POWER TRANSMISSION DEVICE

CROSS-REFERENCE TO RELATED APPLICATION

This application claims the priority of Japan patent application serial no. 2018-049882, filed on Mar. 16, 2018. The entirety of the above-mentioned patent application is hereby incorporated by reference herein and made a part of this specification.

BACKGROUND

Technical Field

The disclosure relates to a vehicle power transmission device.

Description of Related Art

For example, while an electric motor (motor) is used as a driving source of an electric vehicle (EV vehicle), power output from the electric motor is transmitted to the left and right axles through a planetary gear mechanism as a deceleration mechanism and a differential device, and thereby left and right driving wheels are driven to rotate.

Incidentally, a parking brake device for preventing rotation of left and right axles during parking is provided in a vehicle. Patent Document 1 discloses a configuration in which parking gears meshed with the parking brake device are integrally formed with carriers of the planetary gear mechanism.

PATENT DOCUMENTS

[Patent Document 1] Japanese Laid-open No. 2009-061923

However, as disclosed in Patent Document 1, there are circumstances as follows. When parking gears are integrally formed with carriers of the planetary gear mechanism, while the planetary gear mechanism operates, since the parking gears always rotate together with the carriers, when an oil bath (oil bath system) in which a lubricating oil accumulating on a bottom in a case in which the planetary gear mechanism and the like are accommodated is scraped up according to rotation of the parking gears, and provided for lubricating respective parts is used as a lubricating system, stirring resistance of the lubricating oil is constantly generated due to the parking gears with a relatively large diameter, and thereby the power transmission efficiency is reduced, and the fuel efficiency of the vehicle deteriorates accordingly.

SUMMARY

An embodiment of the disclosure provides a vehicle power transmission device 1 which transmits power output from a driving source to left and right axles through planetary gear mechanisms and a differential device and in which a parking gear is provided in a carrier of the planetary gear mechanism, wherein the parking gear is supported on the carrier so that it is relatively rotatable, and a contact and release mechanism for bringing the parking gear and the carrier into contact and disconnecting them is provided.

DESCRIPTION OF THE EMBODIMENTS

Figure 1A:
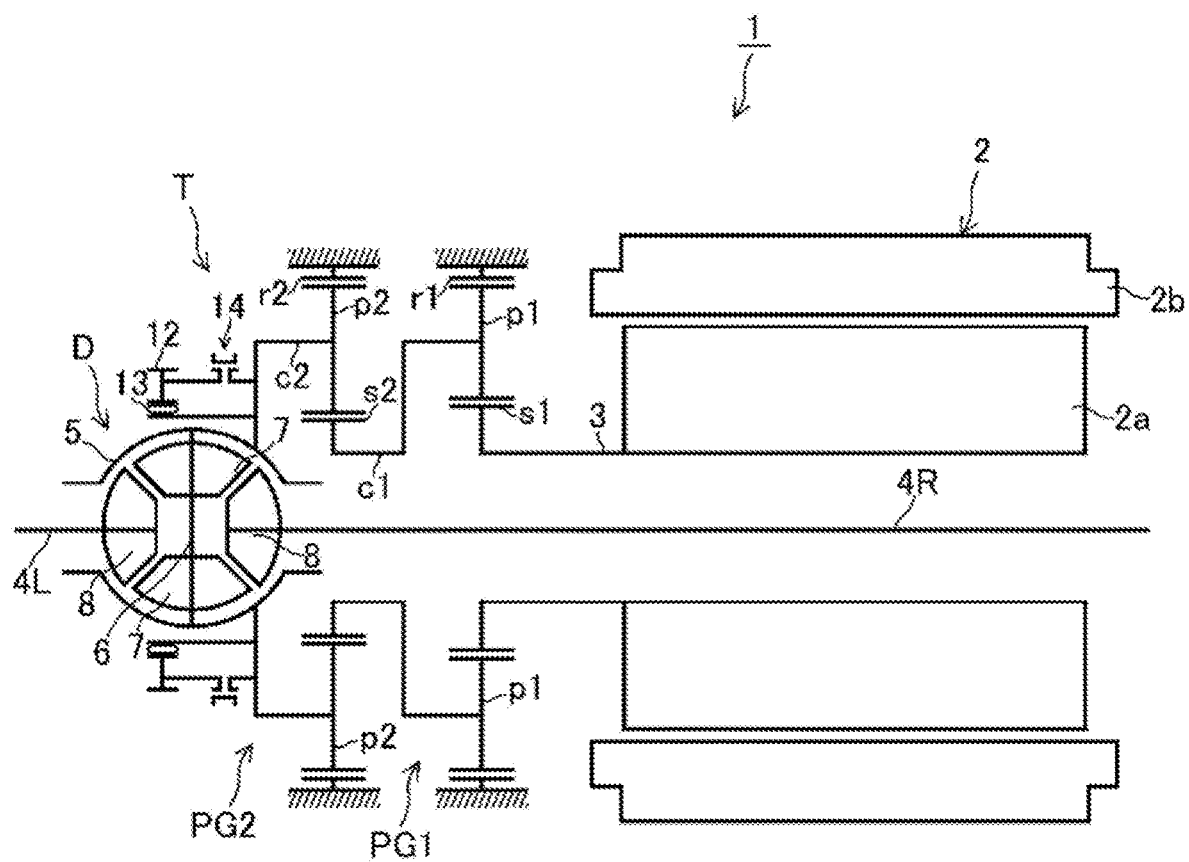
FIG. 1A is a schematic diagram showing a basic configuration of a vehicle power transmission device according to an embodiment of the disclosure.

The embodiments of the disclosure provide a vehicle power transmission device that can increase the power transmission efficiency by rotating a parking gear and lubricating respective parts if necessary and by stopping rotation of the parking gear if unnecessary, and thereby reducing stirring resistance of a lubricating oil.

An embodiment of the disclosure provides a vehicle power transmission device 1 which transmits power output from a driving source 2 to left and right axles 4L and 4R through planetary gear mechanisms PG1 and PG2 and a differential device D and in which a parking gear 12 is provided in a carrier c2 of the planetary gear mechanism PG2, wherein the parking gear 12 is supported on the carrier c2 so that it is relatively rotatable, and a contact and release mechanism for bringing the parking gear 12 and the carrier c2 into contact and disconnecting them is provided.

According to the embodiment of the disclosure, when a vehicle is parked or needs lubrication, or when an oil temperature is low, the parking gear can be connected (linked) to the carrier of the planetary gear mechanism and the parking gear can be rotated together with the carrier. Meanwhile, when the vehicle is traveling and there is no need to rotate the parking gear, since the parking gear can be disconnected from the carrier and its rotation can be stopped, stirring resistance of the lubricating oil due to the parking gear can be reduced and the power transmission efficiency of the vehicle power transmission device can increase.

Here, in the embodiment of the disclosure, the contact and release mechanism may be constituted by a dog clutch 14.

In addition, in the embodiment of the disclosure, the contact and release mechanism may be constituted by a friction clutch 20.

In addition, in the embodiment of the disclosure, a control device 16 for driving and controlling the contact and release mechanisms 14 and 20 based on a shift range, an oil temperature, and a difference in rotation between the left and right axles 4L and 4R may be provided.

Here, in the embodiment of the disclosure, when the shift range is outside a parking range, an oil temperature is a set value or higher, and a difference in rotation between the left and right axles is less than a set value, the control device 16 may turn off the contact and release mechanisms 14 and 20 and disconnect the parking gear 12 from the carrier c2, and otherwise, may turn on the contact and release mechanisms 14 and 20 and connect the parking gear 12 to the carrier c2.

According to the embodiments of the disclosure, it is possible to increase the power transmission efficiency of the vehicle power transmission device by rotating a parking gear and lubricating respective parts if necessary and by stopping rotation of the parking gear if unnecessary, and thereby reducing stirring resistance of a lubricating oil.

Embodiments of the disclosure will be described below with reference to the appended drawings.

Figure 1B:
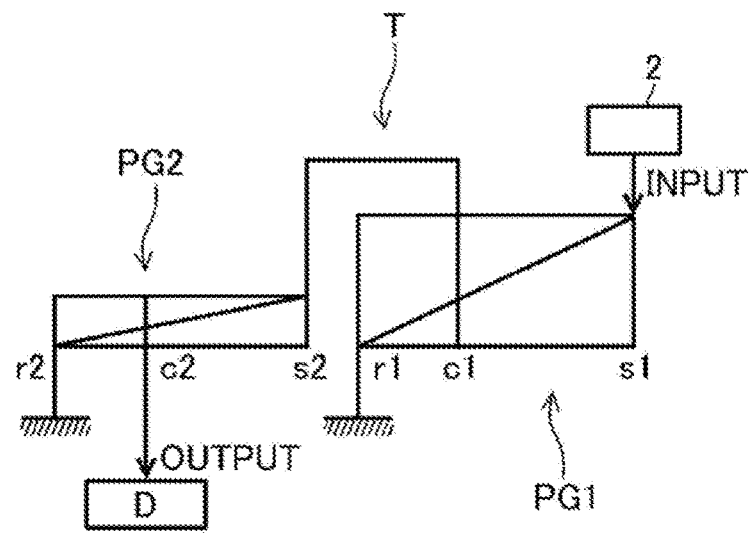
FIG. 1B is a speed diagram of a deceleration mechanism of the same vehicle transmission device.
Figure 2:
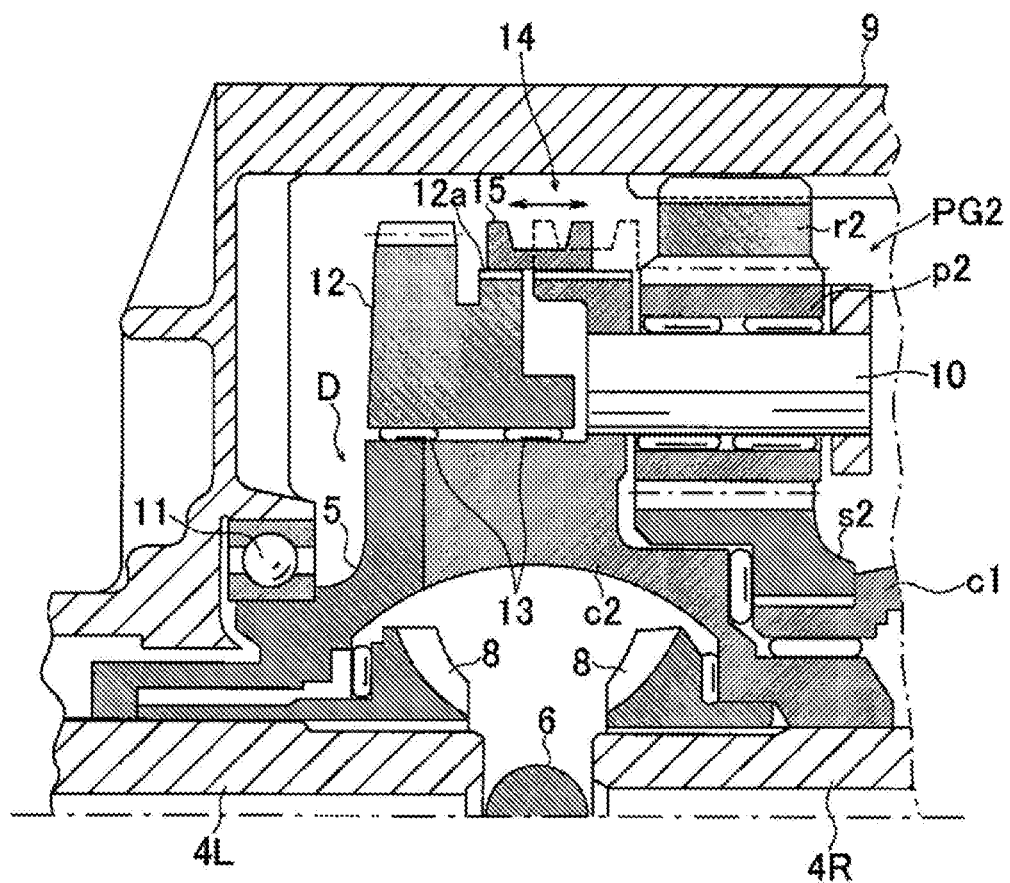
FIG. 2 is a longitudinal cross-sectional view showing a half-cut main part of the vehicle power transmission device according to the embodiment of the disclosure.

FIG. 1A is a schematic diagram showing a basic configuration of a vehicle power transmission device according to an embodiment of the disclosure, and FIG. 1B is a speed diagram of a deceleration mechanism of the same vehicle power transmission device. FIG. 2 is a longitudinal cross-sectional view showing a half-cut main part of the same vehicle power transmission device.

A vehicle power transmission device 1 shown in FIG. 1A is provided in an electric vehicle (EV vehicle), and includes an electric motor (motor) 2 as a driving source. Here, in the present embodiment, the electric motor 2 is a 3-phase brushless motor, and includes a hollow rotor 2a rotatably accommodated in a motor case (not shown) and a ring-shaped stator 2b fixed around the rotor 2a. Thus, although not shown, a plurality of permanent magnets are built into the rotor 2a, and coils corresponding to three phases are wound around the stator 2b.

At the axial center of the rotor 2a of the electric motor 2, a cylindrical motor shaft 3 that is elongated in a vehicle width direction (the left to right direction in FIG. 1A) is inserted and fixed, and the motor shaft 3 rotates together with the rotor 2a according to rotational power output from the electric motor 2.

In addition, an axle 4R on the right side is inserted coaxially with the motor shaft 3 into the motor shaft 3, and rotation of the motor shaft 3 is transmitted to the axle 4R through a deceleration mechanism T and a differential device (a differential mechanism) D. Here, the deceleration mechanism T and the differential device D are disposed coaxially with the motor shaft 3 and the axle 4R.

The differential device D includes a pair of pinion gears 7 that are rotatably supported by a pinion shaft 6 and a pair of side gears 8 that are meshed with these pinion gears 7, which are accommodated in a gear case 5. Here, one side gear 8 (on the right side in FIG. 1A) provided in the differential device D is connected to the axle 4R on the right side, and the other side gear 8 (on the left side in FIG. 1A) is connected to an axle 4L on the left side that is disposed coaxially with the axle 4R on the right side. Here, although not shown, left and right driving wheels are attached to ends of the left and right axles 4L and 4R, respectively.

In addition, the deceleration mechanism T includes both a first planetary gear mechanism PG1 and a second planetary gear mechanism PG2 connected in series, and the first planetary gear mechanism PG1 includes a sun gear s1 fixed to the outer circumference of one end (the left end in FIG. 1A) of the motor shaft 3 in the axial direction, a ring gear r1 fixed around the sun gear s1, a plurality of planetary gears p1 that are meshed with both the sun gear s1 and the ring gear r1, and turn and revolve around the sun gear s1, and a carrier c1 that supports these planetary gears p1 so that they can rotate (turn).

In addition, the second planetary gear mechanism PG2 includes a sun gear s2 fixed to the carrier c1 of the first planetary gear mechanism PG1, a ring gear r2 fixed around the sun gear s2, a plurality of planetary gears p2 that are meshed with both the sun gear s2 and the ring gear r2, and turn and revolve around the sun gear s2, and a carrier c2 that supports these planetary gears p2 so that they can rotate (turn). Meanwhile, the carrier c2 of the second planetary gear mechanism PG2 constitutes a part of the gear case 5 of the differential device D (refer to FIG. 2).

Incidentally, in the vehicle power transmission device 1 according to the present embodiment, as shown in FIG. 2, the deceleration mechanism T and the differential device D are integrated and accommodated in a case 9, and the differential device D is disposed to the rear (on the left side in FIG. 2) of the second planetary gear mechanism PG2. Here, the carrier c2 of the second planetary gear mechanism PG2 supports the plurality of planetary gears (in FIG. 2, only one planetary gear is shown) p2 by a spindle 10 so that they can rotate (turn). However, the carrier c2 constitutes a part of the gear case 5 of the differential device D as described above. Here, the inner circumference of one end (the right end in FIG. 2) of the gear case 5 is rotatably supported by the axle 4R and the outer circumference of the other end (the left end in FIG. 2) is rotatably supported in the case 9 by a bearing (ball bearing) 11.

Here, a ring-shaped parking gear 12 is supported on the outer circumference of the carrier c2 by a bearing (needle bearing) 13 so that it is relatively rotatable. The parking gear 12 is meshed with a parking brake device (not shown) that prevents rotation of the left and right axles 4L and 4R when the vehicle is parked, and the parking gear 12 is connected (linked) to the carrier c2 according to turning ON/OFF of a dog clutch 14 which is a contact and release mechanism for bringing the parking gear 12 and the carrier c2 into contact and disconnecting them or is disconnected from the carrier c2. Here, although not shown, a spiral groove for allowing flow of a lubricating oil in the axial direction is engraved on the inner circumferential surface of the parking gear 12.

Here, when the configuration of the dog clutch 14 is described with reference to FIG. 2, the dog clutch 14 includes a sleeve 15 that is spline-fitted to the outer circumference of the carrier c2 in the axial direction (the left to right direction in FIG. 2) so that it is slidable, and a dog spline 12a formed in a part of the outer circumference of the parking gear 12 in the axial direction.

In the dog clutch 14 configured as described above, the sleeve 15 is operated by a shift fork (not shown) or the like, and slides to the left side in FIG. 2. While the sleeve 15 is engaged with the dog spline 12a of the parking gear 12 as indicated by a solid line, the dog clutch 14 is brought into the ON state, the parking gear 12 is connected (linked) to the carrier c2 by the sleeve 15, and the parking gear 12 rotates together with the carrier c2.

Thus, when the sleeve 15 slides from an ON position indicated by a solid line in FIG. 2 toward the right side in FIG. 2, and moves to an OFF position indicated by a dashed line, since the engagement between the sleeve 15 and the dog spline 12a of the parking gear 12 is disengaged, the dog clutch 14 is brought into an OFF state, the parking gear 12 is disconnected from the carrier c2, and rotation is stopped.

In the vehicle power transmission device 1 configured as described above, when power is supplied to the electric motor 2 from a power supply (not shown) such as a battery, the electric motor 2 is activated, the motor shaft 3 rotates together with the rotor 2a, and its rotation is decelerated by both the first planetary gear mechanism PG1 and the second planetary gear mechanism PG2 constituting the deceleration mechanism T and is transmitted to the differential device D. That is, since the sun gear s1 of the first planetary gear mechanism PG1 rotates together with rotation of the motor shaft 3, and the plurality of planetary gears p1 turn and revolve around the sun gear s1 according to rotation of the sun gear s1, the carrier c1 that rotatably supports these planetary gears p1 rotates while decelerating (refer to FIG. 1B).

Here, since the sun gear s2 of the second planetary gear mechanism PG2 rotates together with the carrier c1 according to rotation of the carrier c1 of the first planetary gear mechanism PG1, and the plurality of planetary gears p2 turns and revolves around the sun gear s2 according to rotation of the sun gear s2, the carrier c2 that rotatably supports these planetary gears p2 rotates while decelerating (refer to FIG. 1B).

As described above, since rotation decelerated in two steps by both the first planetary gear mechanism PG1 and the second planetary gear mechanism PG2 is transmitted to the gear case 5 of the differential device D and the gear case 5 rotates, torque in the differential device D is divided into two forces and transmitted to the left and right axles 4L and 4R, rotation of the left and right axles 4L and 4R is transmitted to driving wheels (not shown) and thereby the electric vehicle travels on the road.

Here, in the differential device D, when the vehicle travels in a straight line, since the left and right driving wheels receive the same resistance from the road surface, the pair of pinion gears 7 revolve together with the gear case 5, and distribute and transmit rotational power to the pair of left and right side gears 8. In this case, the pair of pinion gears 7 do not rotate (turn). On the other hand, during cornering when a vehicle turns, since there is a difference in resistance received from the road surface between the left and right driving wheels (a difference in the movement distance between the left and right driving wheels), the pair of pinion gears 7 turn, a rotational speed of one side gear 8 is made higher than a rotational speed of the other side gear 8, the vehicle performs cornering smoothly, and rotational power is distributed and transmitted to the left and right axles 4L and 4R.

Incidentally, in the present embodiment, when the dog clutch 14 is turned ON or OFF, the parking gear 12 is connected (linked) to the carrier c2 of the second planetary gear mechanism PG2 or disconnected from the carrier c2, when the dog clutch 14 is brought into an ON state and the sleeve 15 is at a position indicated by a solid line in FIG. 2, since the parking gear 12 is connected (linked) to the carrier c2, the parking gear 12 rotates together with the carrier c2 at the same speed. When the parking gear 12 rotates in this manner, a lubricating oil accumulating on a bottom in the case 9 shown in FIG. 2 is scraped up by the parking gear 12, and the scraped-up lubricating oil is supplied to respective parts and used for lubrication. For example, since a part of the scraped-up lubricating oil is supplied to the spindle 10 of the carrier c2 along a spiral groove (not shown) formed on the inner circumferential surface of the parking gear 12, and is used for lubrication of a part that supports the planetary gears p2 of the spindle 10, burning of the spindle 10 due to high speed rotation of the planetary gears p2 is prevented. In addition, a part of the lubricating oil is also supplied to the bearing 11. In addition, the remaining lubricating oil is supplied into the gear case 5 of the differential device D, supplied to a part meshing the pinion gears 7 and the side gears 8 accommodated in the gear case 5, and used for lubrication.

On the other hand, when the dog clutch 14 is in an OFF state and the sleeve 15 is at a position indicated by a dashed line in FIG. 2, since the parking gear 12 is disconnected from the carrier c2, transmission of rotation from the carrier c2 to the parking gear 12 is blocked and rotation of the parking gear 12 is stopped. When rotation of the parking gear 12 is stopped in this manner, since a lubricating oil accumulating on a bottom in the case 9 shown in FIG. 2 is not scraped up by the parking gear 12, stirring resistance of the lubricating oil due to the parking gear 12 is reduced, and the power transmission efficiency of the vehicle power transmission device 1 increases.

Incidentally, in the present embodiment, the parking gear 12 is connected (linked) to the carrier c2 and the parking gear 12 is disconnected from the carrier c2 are performed by an electronic control unit (ECU) as a control device, and the ECU performs ON/OFF control on the dog clutch 14 based on a shift position of a vehicle, a temperature (oil temperature) of a lubricating oil, and a differential rotation difference (a difference in rotation between the left and right axles 4L and 4R) by the differential device D. Here, the configuration and control procedures of the control system will be described below with reference to FIG. 3 and FIG. 4.

Figure 3:
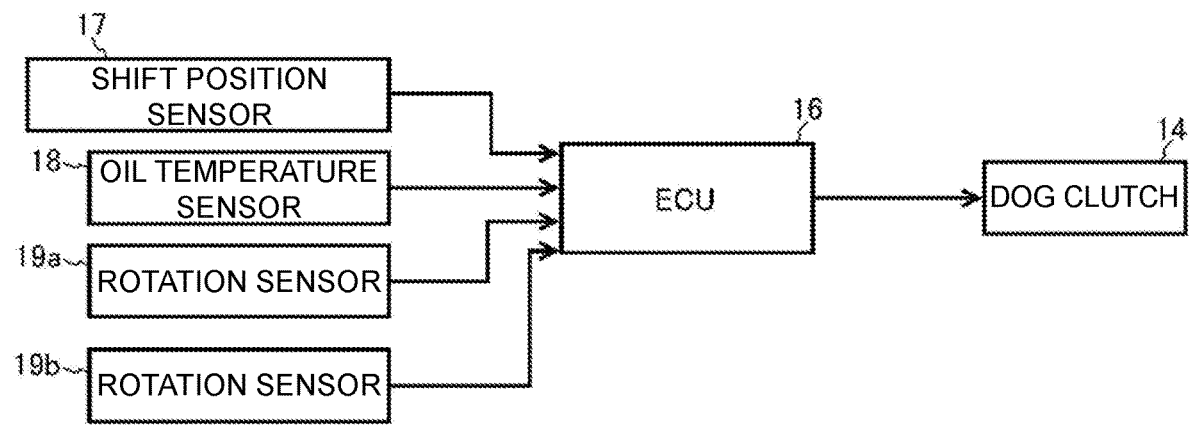
FIG. 3 is a control system diagram of the vehicle power transmission device according to the embodiment of the disclosure.
Figure 4:
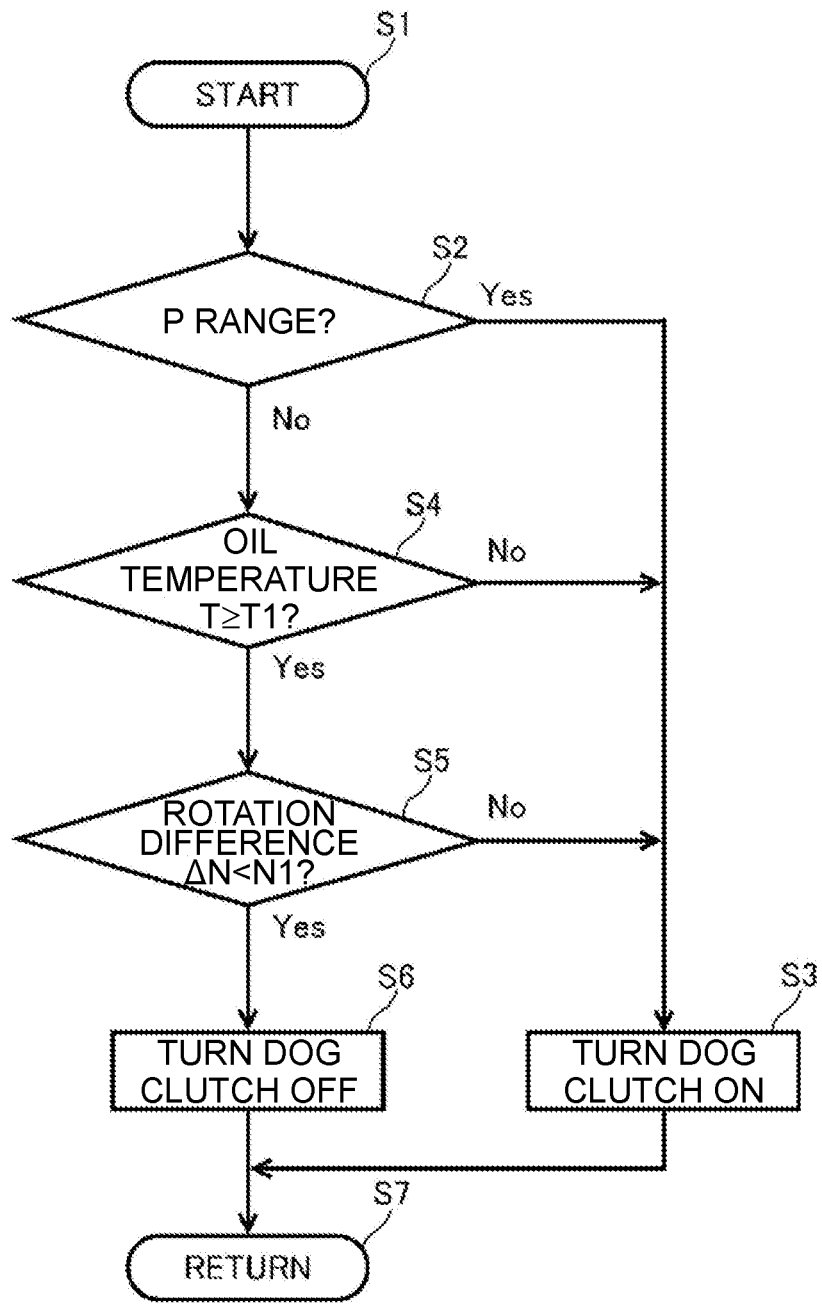
FIG. 4 is a flowchart showing control procedures of the vehicle power transmission device according to the embodiment of the disclosure.

That is, FIG. 3 is a configuration diagram of a control system of the vehicle power transmission device 1 according to the embodiment of the disclosure. FIG. 4 is a flowchart showing control procedures. In the control system shown in FIG. 3, when a shift position detected by a shift position sensor 17, a temperature (oil temperature) of a lubricating oil detected by an oil temperature sensor 18, and rotational speeds of the left and right axles 4L and 4R detected by a pair of rotation sensors 19$a$ and 19$b$ are input to an ECU 16 as a control device configured to perform ON/OFF control on the dog clutch 14, the ECU 16 performs ON/OFF control on the dog clutch 14 based on various types of information. Procedures of ON/OFF control on the dog clutch 14 performed by the ECU 16 will be described below with reference to FIG. 4.

When control starts (Step S1 in FIG. 4), it is determined whether a shift position detected by the shift position sensor 17 shown in FIG. 3 is in a parking range (P range) (Step S2). As a result of the determination, when a vehicle is in a parking state and the shift position is in the P range (Yes in Step S2), the dog clutch 14 is turned ON, and the parking gear 12 is connected (linked) to the carrier c2 (Step S3). When the vehicle is in a parking state, since both the electric motor 2 and the vehicle power transmission device 1 are stopped, the parking gear 12 is connected (linked) to the carrier c2 that is not rotating, and it is necessary to prevent movement of the vehicle by a parking brake device (not shown) with which the parking gear 12 is meshed.

On the other hand, when a shift position of a vehicle is outside a P range (NO in Step S2), the electric motor 2 and the vehicle power transmission device 1 are in operation. However, in this case, it is determined whether a temperature (oil temperature) T of a lubricating oil detected by the oil temperature sensor 18 shown in FIG. 3 is a set value T1 or more (T≥T1) (Step S4). As a result of determination, when a temperature (oil temperature) T of a lubricating oil is less than the set value T1 (T<T1) (NO in Step S4), since it is necessary to increase a temperature (oil temperature) of the lubricating oil, the dog clutch 14 is turned ON (Step S3), the parking gear 12 is connected (linked) to the carrier c2, the parking gear 12 is rotated together with the carrier c2, the lubricating oil is stirred by the parking gear 12, and its temperature (oil temperature) increases.

On the other hand, when a temperature (oil temperature) T of a lubricating oil is equal to or higher than the set value T1 (T≥T1) (Yes in Step S4), it is determined whether a difference ΔN in the rotational speed between the left and right axles 4L and 4R detected by the pair of rotation sensors 19$a$ and 19$b$ shown in FIG. 3 is less than a set value ΔN1 (ΔN<ΔN1) (Step S5). As a result of the determination, when a difference ΔN in the rotational speed between the left and right axles 4L and 4R is equal to or higher than the set value ΔN1 (ΔN≥ΔN1) (NO in Step S5), since it is necessary to prevent burning of the pinion shaft 6 due to high speed rotation of the pinion gears 7 and the side gears 8 in the differential device D, the dog clutch 14 is turned ON (Step S3), the parking gear 12 is connected (linked) to the carrier c2, the carrier c2 is rotated together therewith, and a lubricating oil is scraped up by the parking gear 12, supplied to the differential device D, and lubricates the pinion gears 7 and the side gears 8 in the gear case 5.

On the other hand, when a difference ΔN1 in the rotational speed between the left and right axles 4L and 4R is less than a set value ΔN1 (ΔN<ΔN1) (Yes in Step S5), the dog clutch 14 is turned OFF (Step S6), the parking gear 12 is disconnected from the carrier c2 and its rotation is stopped, and stirring resistance of the lubricating oil due to the parking gear 12 is reduced. As a result, it is possible to increase the power transmission efficiency of the vehicle power transmission device 1 and increase the fuel efficiency of the vehicle as a result.

The above processes are repeated thereafter (Step S7).

As described above, according to the present embodiment, when the parking gear 12 is rotated and respective parts are lubricated if necessary and when rotation of the parking gear 12 is stopped and stirring resistance of the lubricating oil is reduced if unnecessary, an effect of increasing the power transmission efficiency of the vehicle power transmission device 1 is obtained.

Figure 5:
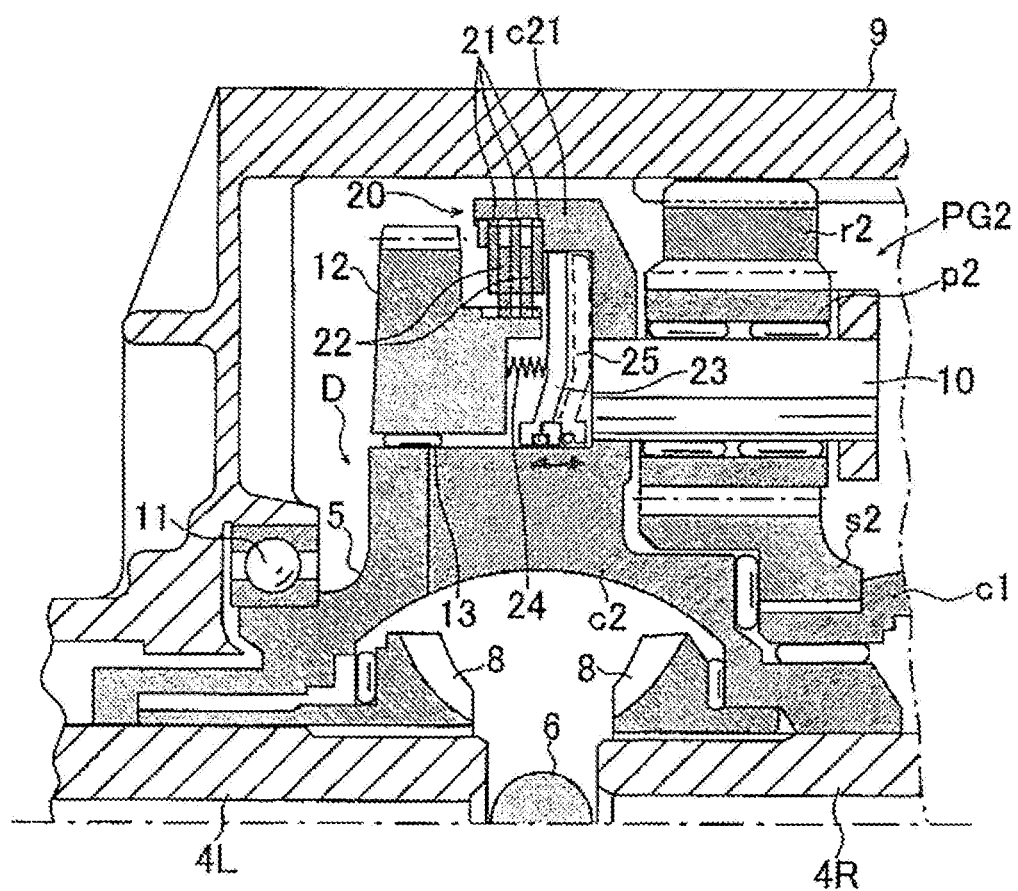
FIG. 5 is a longitudinal cross-sectional view of a half-cut main part of a vehicle power transmission device according to another embodiment of the disclosure.

Incidentally, while an example in which the dog clutch 14 is used as a contact and release mechanism has been described above, a friction clutch (multi-plate clutch) 20 shown in FIG. 5 may be used as the contact and release mechanism.

That is, FIG. 5 is a longitudinal cross-sectional view of a half-cut main part of a vehicle power transmission device which shows an example in which a friction clutch is used as a contact and release mechanism. The shown friction clutch 20 includes a plurality of ring-shaped friction plates 21 that are fixed to the inner circumference of a guide part c21 integrally formed with the carrier c2 in the axial direction at appropriate intervals, and a plurality of ring-shaped disk plates 22 that are fixed to the outer circumference of the parking gear 12. The friction plate 21 and the disk plate 22 are alternately disposed in the axial direction.

In addition, the friction clutch 20 includes a ring-shaped clutch piston 23 that is engaged with the carrier c2 so that it is slidable in the axial direction and a return spring 24 that biases the clutch piston 23 to the right side in FIG. 5 (an OFF direction in the friction clutch 20), and a ring-shaped oil chamber 25 is defined between the carrier c2 and the clutch piston 23.

Here, in FIG. 5, the same components as shown in FIG. 2 will be denoted with the same reference numerals and descriptions thereof will not be repeated below.

In the friction clutch 20 configured as described above, when a pressurized oil with a predetermined pressure is supplied to the oil chamber 25, due to a pressure of the pressurized oil, the clutch piston 23 slides in the axial direction against a biasing force of the return spring 24, and moves to the left side in FIG. 5. As a result, since the friction plate 21 and the disk plate 22 are clamped by the clutch piston 23, the friction clutch 20 becomes a ON state, and due to a frictional force generated between the friction plate 21 and the disk plate 22, the parking gear 12 is connected (linked) to the carrier c2, and the parking gear 12 rotates together with the carrier c2 at the same speed.

Then, when the friction clutch 20 is in an ON state as described above, a pressurized oil of the oil chamber 25 is removed, and a force acting on the clutch piston 23 is released. Since the clutch piston 23 slides and moves to the right side in FIG. 5 due to a biasing force of the return spring 24, a pressure contact state between the friction plate 21 and the disk plate 22 is released, and a frictional force generated between them is released. As a result, since the friction clutch 20 becomes an OFF state and the parking gear 12 is disconnected from the carrier c2, rotation of the parking gear 12 is stopped.

As described above, even if the friction clutch 20 is used as a contact and release mechanism, when the friction clutch 20 is turned ON or OFF, the parking gear 12 can be connected (linked) to the carrier c2 or the parking gear 12 can be disconnected from the carrier c2, and the same effect as in the above embodiment in which the dog clutch 14 shown in FIG. 2 is used as a contact and release mechanism can be obtained.

Here, any component such as a 2-way clutch and an electromagnetic clutch can be used as a contact and release mechanism.

In addition, while a case in which the disclosure is applied to a power transmission device of an electric vehicle (EV vehicle) using an electric motor a driving source has been exemplified in the above embodiment, the disclosure can also be applied to power transmission devices of a hybrid vehicle in which both an engine and an electric motor are used as driving sources and a vehicle in which only an engine is used as a driving source.

In addition, the application of the disclosure is not limited to the embodiment described above, and various modifications can be made within the scope of the claims and the scope of the technical ideas described in this specification and the drawings.

What is claimed is:

1. A vehicle power transmission device which transmits power output from a driving source to left and right axles through a planetary gear mechanism and a differential device and in which a parking gear is provided in a carrier of the planetary gear mechanism,
   wherein the parking gear is supported on the carrier so that it is relatively rotatable, and a contact and release mechanism for bringing the parking gear and the carrier into contact and disconnecting them is provided.

2. The vehicle power transmission device according to claim 1,
   wherein the contact and release mechanism is constituted by a dog clutch.

3. The vehicle power transmission device according to claim 2,
   wherein a control device for driving and controlling the contact and release mechanism based on a shift range, an oil temperature, and a difference in rotation between the left and right axles is provided.

4. The vehicle power transmission device according to claim 3,
   wherein, when the shift range is outside a parking range, an oil temperature is a set value or higher, and a difference in rotation between the left and right axles is less than a set value, the control device turns off the contact and release mechanism and disconnects the parking gear from the carrier, and otherwise, turns on the contact and release mechanism, and connects the parking gear to the carrier.

5. The vehicle power transmission device according to claim 1,
   wherein the contact and release mechanism is constituted by a friction clutch.

6. The vehicle power transmission device according claim 5,
 wherein a control device for driving and controlling the contact and release mechanism based on a shift range, an oil temperature, and a difference in rotation between the left and right axles is provided.

7. The vehicle power transmission device according to claim 6,
 wherein, when the shift range is outside a parking range, an oil temperature is a set value or higher, and a difference in rotation between the left and right axles is less than a set value, the control device turns off the contact and release mechanism and disconnects the parking gear from the carrier, and otherwise, turns on the contact and release mechanism, and connects the parking gear to the carrier.

8. The vehicle power transmission device according to claim 1,
 wherein a control device for driving and controlling the contact and release mechanism based on a shift range, an oil temperature, and a difference in rotation between the left and right axles is provided.

9. The vehicle power transmission device according to claim 8,
 wherein, when the shift range is outside a parking range, an oil temperature is a set value or higher, and a difference in rotation between the left and right axles is less than a set value, the control device turns off the contact and release mechanism and disconnects the parking gear from the carrier, and otherwise, turns on the contact and release mechanism, and connects the parking gear to the carrier.

* * * * *